(12) United States Patent
Andersson et al.

(10) Patent No.: US 12,537,948 B2
(45) Date of Patent: Jan. 27, 2026

(54) DEBLOCKING OF IMPLICIT TRANSFORM UNIT BOUNDARIES

(71) Applicant: Telefonaktiebolaget LM Ericsson (publ), Stockholm (SE)

(72) Inventors: Kenneth Andersson, Gävle (SE); Rickard Sjöberg, Stockholm (SE); Jacob Ström, Stockholm (SE); Zhi Zhang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/754,583

(22) Filed: Jun. 26, 2024

(65) Prior Publication Data

US 2024/0430416 A1    Dec. 26, 2024

Related U.S. Application Data

(63) Continuation of application No. 17/972,036, filed on Oct. 24, 2022, now Pat. No. 12,058,323, which is a continuation of application No. 16/607,594, filed as application No. PCT/EP2019/062350 on May 14, 2019, now Pat. No. 11,490,080.

(60) Provisional application No. 62/673,110, filed on May 17, 2018.

(51) Int. Cl.
| | |
|---|---|
| *H04N 19/117* | (2014.01) |
| *H04N 19/119* | (2014.01) |
| *H04N 19/18* | (2014.01) |
| *H04N 19/635* | (2014.01) |
| *H04N 19/86* | (2014.01) |

(52) U.S. Cl.
CPC ......... *H04N 19/117* (2014.11); *H04N 19/119* (2014.11); *H04N 19/18* (2014.11); *H04N 19/635* (2014.11); *H04N 19/86* (2014.11)

(58) Field of Classification Search
CPC .... H04N 19/86; H04N 19/117; H04N 19/119; H04N 19/635
See application file for complete search history.

(56) References Cited

U.S. PATENT DOCUMENTS

| | | | |
|---|---|---|---|
| 8,792,561 | B2 | 7/2014 | Min |
| 8,908,760 | B2 | 12/2014 | Jeon |
| 9,167,269 | B2 | 10/2015 | Van Der Auwera |

(Continued)

FOREIGN PATENT DOCUMENTS

| | | |
|---|---|---|
| CN | 104782125 | 7/2015 |
| JP | 2015-537448 | 12/2015 |

(Continued)

OTHER PUBLICATIONS

USPTO Library query—2022. (Year: 2022).

(Continued)

*Primary Examiner* — Luis Perez-Fuentes
(74) *Attorney, Agent, or Firm* — Rothwell, Figg, Ernst & Manbeck, P.C.

(57) ABSTRACT

In one aspect there is disclosed a method of applying deblocking on implicit vertical TU boundaries when the CU width is larger than the maximum TU width and applying deblocking on implicit horizontal TU boundaries when the CU height is larger than the maximum TU height. Some exemplary embodiments include HEVC deblocking and deblocking using longer filters.

20 Claims, 13 Drawing Sheets

(56) References Cited

U.S. PATENT DOCUMENTS

| | | | |
|---|---|---|---|
| 9,554,139 B2 | 1/2017 | Lim | |
| 9,584,810 B2 | 2/2017 | Kim | |
| 9,621,895 B2 | 4/2017 | Kim | |
| 10,070,135 B2* | 9/2018 | Lim | H04N 19/86 |
| 10,477,216 B2* | 11/2019 | Lim | H04N 19/182 |
| 11,490,080 B2* | 11/2022 | Andersson | H04N 19/86 |
| 11,758,131 B2* | 9/2023 | Andersson | H04N 19/189 |
| | | | 375/240.12 |
| 12,058,323 B2* | 8/2024 | Andersson | H04N 19/117 |
| 2013/0101024 A1 | 4/2013 | Van Der Auwera et al. | |
| 2014/0079332 A1 | 3/2014 | Zheng | |
| 2015/0326883 A1 | 11/2015 | Rosewarne | |
| 2016/0330480 A1 | 11/2016 | Liu | |
| 2017/0006309 A1 | 1/2017 | Liu | |
| 2020/0244966 A1 | 7/2020 | Yoo | |
| 2020/0304815 A1 | 9/2020 | Zhao | |
| 2021/0006799 A1 | 1/2021 | Lee | |
| 2021/0120261 A1 | 4/2021 | Lim | |
| 2021/0136369 A1 | 5/2021 | Lim | |
| 2021/0368172 A1 | 11/2021 | Lim | |

FOREIGN PATENT DOCUMENTS

| | | |
|---|---|---|
| KR | 10-2014-0085545 | 7/2014 |
| KR | 10-2017-0054558 | 5/2017 |
| WO | 2017/157249 | 9/2017 |

OTHER PUBLICATIONS

Side information signaling improvement for Tu; Lee—2012. (Year: 2012).

Coherent transform split pattern for non-square transform units; Kim—2012. (Year: 2012).

International Search Report and Written Opinion dated Jun. 27, 2019 issued in International Application No. PCT/EP2019/062350. (15 pages).

Lee et al., "Side information signaling improvement for TU", Joint Collaborative Team on Video Coding (JCT-VC) of ITU-T SG16 WP3 and ISO/IEC JTC1/SC29/WG11; 8th Meeting: San Jose, CA, USA, Feb. 1-10, 2012; Document JCTVC-H0154; (Feb. 2012). (3 pages).

Sjoberg, R., et al., "Description of SDR and HDR video coding technology proposal by Ericsson and Nokia", Joint Video Exploration Team (JVET) of ITU-T SG 16 WP 3 and ISO/IEC JTC 1/SC 29/WG 11; 10th Meeting: San Diego, CA, USA, Apr. 10-20, 2018; Document: JVET-J0012-v1; (Apr. 2018). (32 pages).

Okubo, Suzuki, Takamura, Nakajo, Impress Standard Textbook Series, H. 265/HEVC Textbook, Impress Japan Corp. Published Oct. 21, 2013, (12 pages).

Bross, "Versatile Video Coding (Draft 1)," Joint Video Experts Team (JVET), Apr. 2018, pp. 1-40.

* cited by examiner

DEBLOCKING OF IMPLICIT TRANSFORM UNIT BOUNDARIES

CROSS-REFERENCE TO RELATED APPLICATIONS

This application is a continuation of U.S. application Ser. No. 17/972,036, filed on 2022 Oct. 24 (now U.S. Pat. No. 12,058,323, issued 2024 Aug. 6), which is a continuation of U.S. application Ser. No. 16/607,594, filed on 2019 Oct. 23 (now U.S. Pat. No. 11,490,080, issued on 2022 Nov. 1), which is the 35 U.S.C. § 371 National Stage of International Patent Application No. PCT/EP2019/062350, filed 2019 May 14, which claims priority to U.S. provisional application No. 62/673,110, filed on 2018 May 17. The above identified applications and patent are incorporated by reference.

TECHNICAL FIELD

This disclosure relates to video coding and decoding.

BACKGROUND

A video sequence consists of a series of images where each image consists of one or more components. Each component can be described as a two-dimensional rectangular array of sample values. It is common that an image in a video sequence consists of three components: one luma component Y, where the sample values are luma values, and two chroma components Cb and Cr, where the sample values are chroma values. Other examples components include Y' Cb Cr, Yuv, and $IC_TC_P$. For $IC_TC_P$, I is referred to as an "intensity luma" component. In the context of the current disclosure, any luma component (e.g., Y', Y or I) is referred to as Y or luma. It is common that the dimensions of the chroma components are smaller than the luma components by a factor of two in each dimension. For example, the size of the luma component of an HD image may be 1920×1080 and the chroma components may each have the dimension of 960×540. Components are sometimes referred to as color components.

A block is one two-dimensional array of samples. In video coding, each component is split into blocks and the coded video bitstream comprises a series of blocks. It is common in video coding that an image is split into units, each of which covers a specific area of the image. Each unit consists of blocks from each of the components that make up that specific area and each block is completely included in the unit. The macroblock in H.264 and the Coding Unit (CU) in HEVC are examples of such units.

In HEVC, each picture is partitioned into coding tree units (CTU). A CTU consists of an NxN block of luma samples and two corresponding MxM chroma blocks. A CTU in HEVC is like macroblocks in H.264 and earlier standards, but in contrast to macroblocks, the size of the CTU is configurable. In most instances, however, the CTU size in HEVC is set to 64×64 luma samples. Each CTU can be recursively quadtree split. The root of the quadtree is then associated with the CTU. The quadtree is split until a leaf is reached, which is referred to as the Coding Unit (CU). A CU in HEVC always consist of a luma block with equal height and width. Information regarding how each CTU is split is conveyed in the bitstream. Furthermore, the CU is the root node of two other trees, a prediction tree comprising prediction units (PUs) as nodes and a transform tree comprising transform units (TUs) as nodes. Some decoding processes are performed on the CU level, the PU level, and the TU level. Boundaries between adjacent PUs and boundaries between adjacent TUs are filtered by a deblocking filter to reduce discontinuities between TUs and PUs. In HEVC there exists two kinds of prediction types for a PU: (1) intra prediction which only uses prediction from previously decoded samples of the current picture for prediction and (2) inter prediction which uses prediction from at least one previously decoded picture.

In HEVC, deblocking is first applied on vertical boundaries and then on horizontal boundaries. The boundaries are either TU boundaries or PU boundaries. To enable parallel friendly deblocking, the deblocking is performed on an 8×8 sample grid.

A deblocking filter strength parameter (bs) is set for each boundary. If the value of bs for a boundary is larger than 0, then deblocking may be applied to the boundary. The strength of the applied filtering depends on how large the boundary strength is. For example, in a first step is it checked whether any of the blocks at a PU boundary between the blocks is an intra predicted block. If the PU boundary between the blocks is an intra predicted block, the deblocking filter strength parameter for the PU boundary is set to 2 (e.g., the bs is set to 2). If both blocks use inter prediction, but the blocks use different reference frames or have significantly different motion vectors, the deblocking filter strength parameter for the PU boundary is set to 1 (e.g., the bs is set to 1). It is also checked whether a TU boundary between the blocks has non-zero transform coefficients in at least one of the blocks (e.g., code block flag CBF equal to 1). If so, then the deblocking filter strength parameter for the TU boundary is set to 1 (e.g., the bs is set to 1).

Accordingly, it is first checked whether a boundary strength (bs) is larger than 0 to determine whether deblocking should be applied. To reduce and/or avoid removing natural structures when deblocking, it is checked whether there are any natural structures on respective sides of the boundary for luma. In HEVC, gradient calculations are used on respective sides of the boundary using the following inequality: abs (p0-2*p1+p2)+abs (q0-2*q1+q2)<beta, where beta is a parameter based on the quantization parameter for the block and p0, p1, to p2 are samples on one side of the block boundary and q0, q1, to q2 are samples on the other side of the block boundary. The condition is checked at two positions along the boundary, and if both conditions are fulfilled, then the luma samples are deblocked for that sample part of the boundary. Chroma boundaries may always be filtered if one any of the neighbouring blocks are intra coded.

In the current draft of the specification for H.266 (VVC draft 1 JVET-J1001v1) (hereinafter referred to as "VCC"), a coding tree unit (CTU) is similar to the CTU in HEVC with the difference that the CTU in VCC has a size of 128×128 luma samples. In VVC, the CTU can be split more flexibly such that a resulting CU may comprise a rectangular luma block. In VVC, there is no prediction tree as in HEVC. However, a CU in VVC can implicitly be divided into a plurality of TUs. Implicit TUs, however, only appear when the CU size has a width or height larger than a maximum transform size. If the CU size does not have a width or height larger than the maximum transform size, the CU does not have a prediction tree or a transform tree. In VVC, deblocking is first applied on vertical CU boundaries and then on horizontal CU boundaries and the deblocking is based on HEVC deblocking.

SUMMARY

In the current draft of the specification for H.266 (VVC draft 1) only block boundaries corresponding to a CU boundary are deblocked. The VVC draft 1, however, dose not account for the problem of blocking artifacts that can appear at implicit TU boundaries.

As shown above, there remains a need for an improved method of deblocking application.

Accordingly, certain embodiments disclosed herein provide a method of applying deblocking on implicit vertical TU boundaries when the CU width is larger than the maximum TU width and applying deblocking on implicit horizontal TU boundaries when the CU height is larger than the maximum TU height. Some exemplary embodiments include HEVC deblocking and deblocking using longer filters.

The embodiments disclosed herein may be applied on a single color component or on all color components. Examples of color components include, but are not limited to, luma, Cb and Cr.

In one aspect, there is provided a method performed by a decoder for decoding a video picture. The method includes the decoder splitting a luma component of a coding unit or block into a first block a second block of Z luma samples vertically and width Y luma samples horizontally without decoding any syntax element indicating such a split on a block level, wherein a maximum size for the video picture is equal to an integer value N, the coding unit or block in the video picture comprises a size of heightY luma samples vertically and width Y luma samples horizontally, the heightY is larger than N, the widthY is equal to or smaller than N, and Z is equal to the width Y/2; decoding at least one transform coefficient for one or more of the first block and the second block; applying an inverse transform to one or more of the first block and the second block; and applying a deblocking filter to a boundary between the first block and the second block that modifies one or more luma samples on the first block side of the boundary and one or more luma samples on the second block side of the boundary.

In another aspect, there is provided a method performed by an encoder to encode a video picture. The method includes the encoder partitioning a video picture into multiple coding units; splitting a luma component of a coding unit or block into a first block and a second block of Z luma samples vertically and widthY luma samples horizontally without including any syntax element indicating such a split on a block level into the encoded video picture, wherein a maximum size for the video picture is equal to an integer value N, the coding unit or block in the video picture comprises a size of heightY luma samples vertically and widthY luma samples horizontally, the heightY is larger than N, the widthY is equal to or smaller than N, and Z is equal to height Y/2; including at least one transform coefficient into the encoded video picture for one or more of the first block and the second block; and applying a deblocking filter to a boundary between the first block and the second block that modifies one or more luma samples on the first block side of the boundary and one or more luma samples on the second block side of the boundary.

In another aspect, there is provided a method performed by a decoder to decode a video picture. The method includes the decoder splitting a luma component of a coding unit or block into a first block a second block of Z luma samples horizontally and heightY luma samples vertically without decoding any syntax element indicating such a split on the block level, wherein a maximum size for the video picture is equal to an integer value N, the coding unit or block in the video picture comprises a size of heightY luma samples vertically and width Y luma samples horizontally, the heightY is larger than N, the width Y is equal to or smaller than N, and Z is equal to the width Y/2; decoding at least one transform coefficient for one or more of the first block and the second block; applying an inverse transform to one or more of the first block and the second block; and applying a deblocking filter to a boundary between the first block and the second block that modifies one or more luma samples on the first block side of the boundary and one or more luma samples on the second block side of the boundary.

In another aspect, there is provided a method performed by a decoder to decode a video picture. The method includes the decoder splitting a chroma component of a coding unit or block into a first block a second block of Z chroma samples vertically and widthC chroma samples horizontally without decoding any syntax element indicating such a split on a block level, wherein a maximum size for the video picture is equal to an integer value N, the coding unit or block in the video picture comprises a size of heightC chroma samples vertically and widthC chroma samples horizontally, the heightC is larger than N, the widthC is equal to or smaller than N, and Z is equal to heightC/2; decoding at least one transform coefficient for one or more of the first block and the second block; applying an inverse transform to one or more of the first block and the second block; and applying a deblocking filter to a boundary between the first block and the second block that modifies one or more chroma samples on the first block side of the boundary and one or more chroma samples on the second block side of the boundary.

In another aspect, there is provided a method performed by an encoder to encode a video picture. The method includes the encoder partitioning a video picture into multiple coding units; splitting a chroma component of a coding unit or block into a first block and a second block of Z chroma samples vertically and widthC chroma samples horizontally without including any syntax element indicating such a split on a block level into the encoded video picture, wherein a maximum size for the video picture is equal to an integer value N, the coding unit or block in the video picture comprises a size of heightC chroma samples vertically and widthC chroma samples horizontally, heightC is larger than N, widthC is equal to or smaller than N, and Z is equal to the heightC/2; including at least one transform coefficient into the encoded video picture for one or more of the first block and the second block; and applying a deblocking filter to a boundary between the first block and the second block that modifies one or more chroma samples on the first block side of the boundary and one or more chroma samples on the second block side of the boundary.

In another aspect, there is provided a method performed by a decoder to decode a video picture. The method includes the decoder splitting a chroma component of a coding unit or block into a first block a second block of Z chroma samples horizontally and heightC chroma samples vertically without decoding any syntax element indicating such a split on the block level, wherein a maximum size for a video picture is set equal to the integer value N, the coding unit or block in the video picture comprises a size of heightC chroma samples vertically and widthC chroma samples horizontally, the heightC is larger than N, the widthC is equal to or smaller than N, and Z is equal to heightC/2; decoding at least one transform coefficient for one or more of the first block and the second block; applying an inverse transform to one or more of the first block and the second block; and applying a deblocking filter to a boundary between the first block and the second block that modifies one or more chroma samples on the first block side of the boundary and one or more chroma samples on the second block side of the boundary.

The embodiments disclosed herein provide a significant reduction of discontinuities across implicit TU boundaries. This can substantially improve the subjective quality.

BRIEF DESCRIPTION OF THE DRAWINGS

The accompanying drawings, which are incorporated herein and form part of the specification, illustrate various embodiments.

DETAILED DESCRIPTION

Certain embodiments disclosed herein provide a method for video encoding or decoding in which CU or block boundaries due to large implicit splits are filtered by a deblocking filter. In the context of the current disclosure, a large implicit split indicates a split of a CU or a block that has at least one side that is spatially larger than a set maximum size. The set maximum size is preferably equal to a set maximum transform size. For example, if a set maximum transform size is equal to 64, then any CU or block that has at least one side larger than 64 is implicitly split into a CU or block with both sides equal to or smaller than 64.

Figure 1:
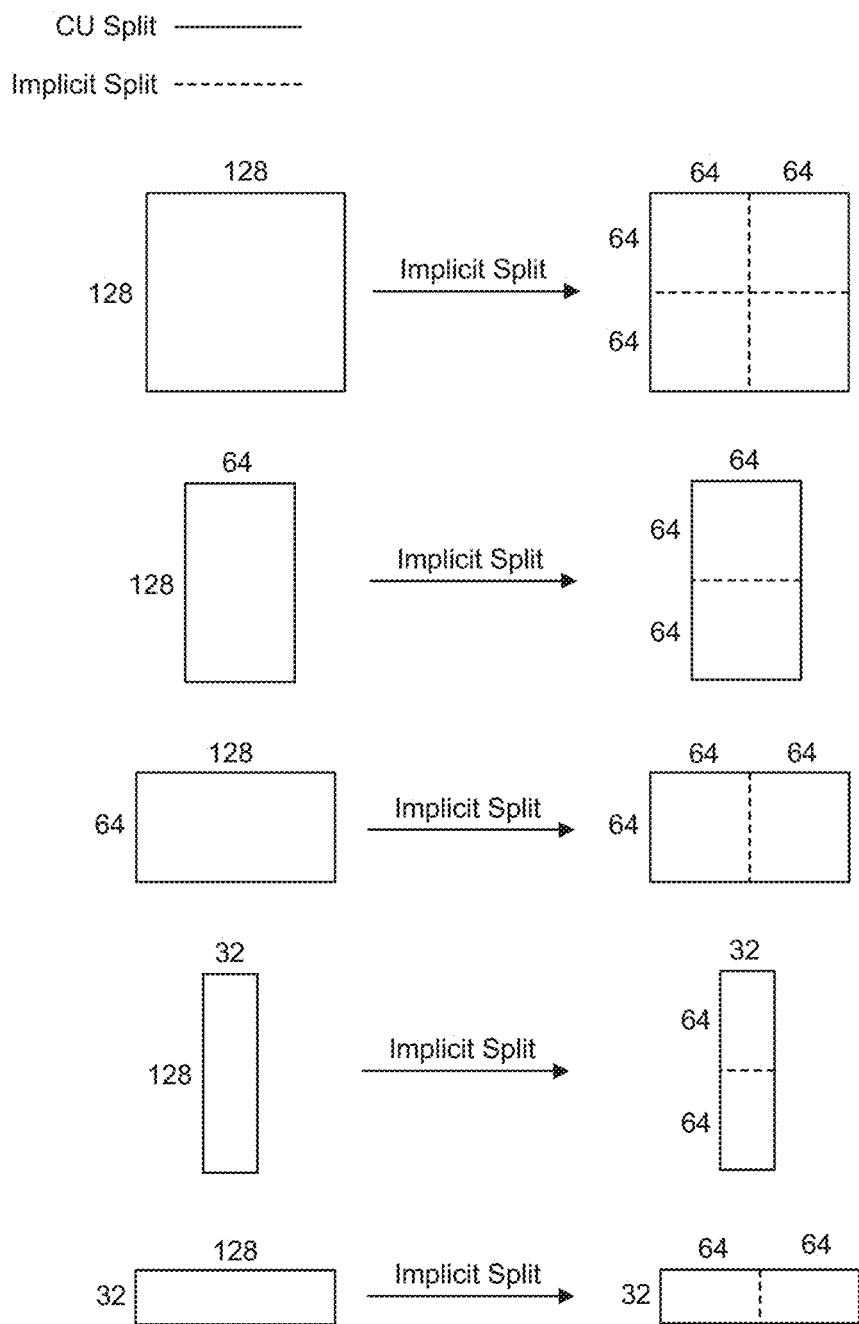
FIG. 1 illustrates split CU or blocks according to some embodiments.

FIG. 1 shows a non-exhaustive set of examples where the CU or block before the split has at least one side equal to 128 and the set maximum size is equal to 64 according to some embodiments. In general, there should be a set maximum size equal to N. For a CU or block with one side larger than N, the CU or block is split on one dimension such that the output CU or block does not have any side larger than N according to some embodiments. For a CU or block with both sides larger than N, the CU or block is split along two dimensions such that the output CU or block does not have any side larger than N according to some embodiments. In the case when the largest allowed transform size is smaller, for example, 32, a block of 128×64 may first be split along both dimensions, thereby producing four blocks of size 64×32. Each of the four blocks may be further split along one dimension, where each split produces two blocks of size 32×32.

As noted above, an implicit split is a result of a comparison between the size of the CU or block and the maximum size. Accordingly, there is no syntax element conveying the split information regarding an implicit split for a particular block. Instead, the maximum size could for example either be set to a fixed value in a video coding specification, or alternatively signaled in the bitstream according to some embodiments. If the maximum size is signaled in the bitstream, the maximum size is signaled once for multiple CUs or blocks, such as once per video clip, once per set of pictures, once per picture or once per slice.

A decoder does not decode or parse any syntax element indicating an implicit split for a particular CU or block. Instead, the decoder derives the split by comparing the size of the particular CU or block with the maximum size indicated in the bitstream or set as a fixed value in the video coding specification. Similarly, an encoder does not encode or signal any syntax element indicating an implicit split for a particular CU or block on the block level. That is, an encoder does not indicate an implicit split in block level information. Instead, the encoder derives the split by comparing the size of the particular CU or block with the maximum size indicated in the bitstream or set as a fixed value in the video coding specification. In the context of the current disclosure, block level information comprises syntax elements that are sent/encoded and received/decoded on a block-by-block basis. One example of a block level syntax element contained in block level information is a transform coefficient. Another example of a block level syntax element is a delta quantizer value.

In some embodiments, the implicit split may take place after the regular CU split process. In the context of the current disclosure, a regular CU split indicates a split that is part of splitting the CTU into CUs where the split is signalled by one or more syntax elements in the coded video picture on a block-by-block basis. For instance, a picture may be partitioned into CTUs of size 128×128. In this instance, the maximum size is assumed to be equal to a value less than the CTU size, for example 64. As an example, when one CTU is decoded, there may one or more syntax elements in the coded video sequence specifying that the CTU should be split into two CUs of size 128×64. In this example, there are no syntax elements in the coded video sequence indicating that the CU's need to be split any further. Since 128 is larger than the maximum size 64, the 128×64 CU is implicitly split into two units of size 64×64. In some embodiments, the blocks for each component of the CU may be implicitly split one by one. For example, the luma part of the CU might be a block of size 128×64 and split into two blocks of size 64×64. One chroma part of the CU might be a block of size 64×32 and not implicitly split if one maximum size is used for all components. In some embodiments, a separate maximum size may be specified for chroma (either as one maximum size for all chroma components, or separate maximum size values for each component). For example, the maximum size for chroma may be set to 32. In such embodiments, the chroma block is split into 32×32 blocks.

Then when another CTU is decoded, there is one or more syntax elements in the coded video sequence specifying that the CTU should be split into three CUs of sizes 128×N, 128×M and 128×N, where 2*N+M is equal to 128. Example values of N and M are 32 and 64 respectively, such that the CU sizes becomes 128×32, 128×64 and 128×32. There are no syntax elements in the coded video sequence to split any of the CUs further. Each 128×32 CU is then implicitly split into two units of 64×32 and the 128×64 CU is implicitly split into two units of 64×64. Alternatively, the implicit splits are done on blocks, such that the luma blocks of sizes 128×32 and 128×64 are implicitly split into blocks of sizes 64×32 and 64×64 respectively. The chroma blocks may have the sizes of 64×16 and 64×32. If the maximum size for a particular chroma component is equal to 64, no implicit split of the chroma blocks are done. If the maximum size for a particular chroma component is equal to 32, the chroma blocks are split from 64×16 and 64×32 into blocks of sizes 32×16 and 32×32 respectively.

It should be noted that the CTU size 128×128 is merely an example and that a CTU size could be either larger or smaller than that. Likewise, the maximum size could be either larger or smaller than 64. The example above could be either a horizontal split or a vertical split. The regular CU split process can also consist of a series of vertical, horizontal splits as well as quad splits from a block or unit of size 2N×2N into four blocks or units of size N×N. The vertical or horizontal splits may split one block or unit into 2 or 3 or more blocks or units.

Figure 2:
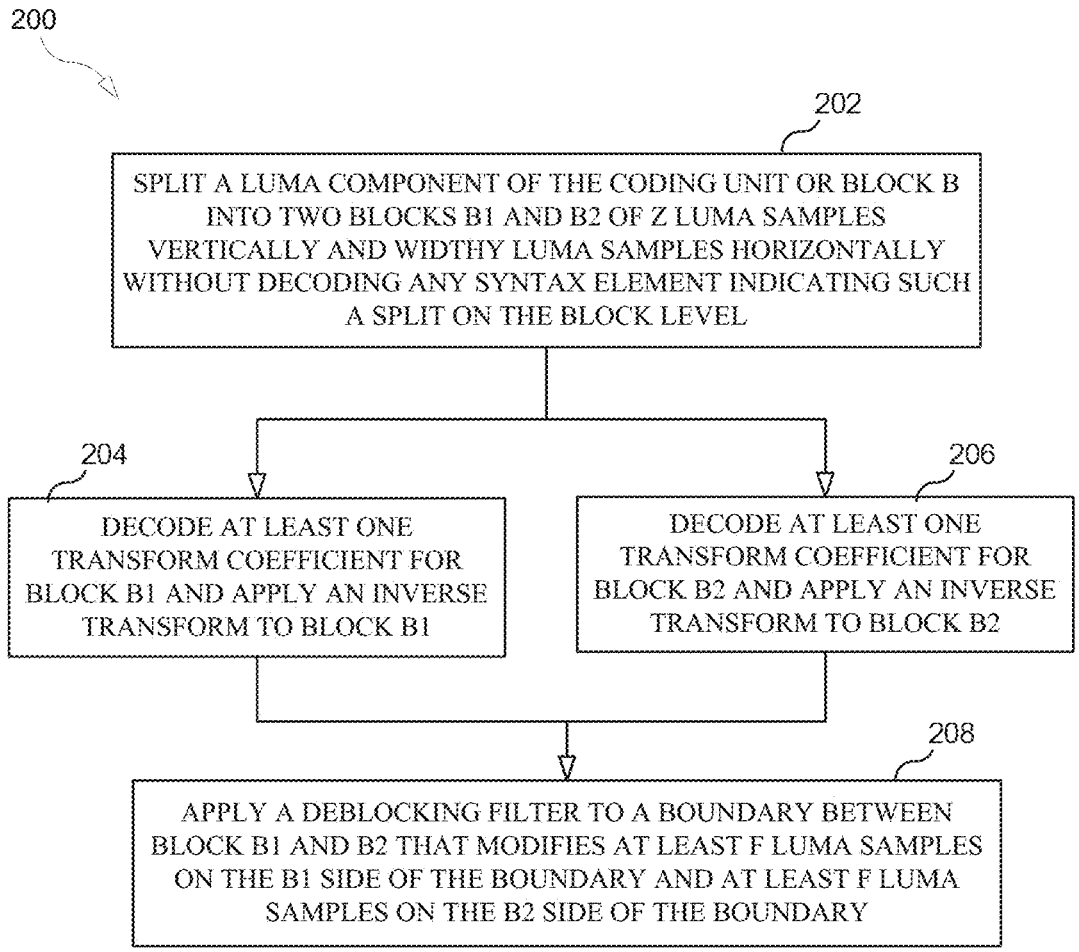
FIG. 2 is a flow chart illustrating a process according to one embodiment.

FIG. 2 is a flow chart illustrating a decoding process 200 with vertical implicit split for luma according to some embodiments. The decoding process 200 may be performed by a decoder. In some embodiments, a maximum size for a video picture is set equal to the integer value N, one coding unit or block B in the video picture has a size of heightY luma samples vertically and width Y luma samples horizontally, heightY is larger than N, and widthY is equal to or smaller than N.

The decoding process 200 for decoding the video picture partitioned into multiple coding units (CUs) may begin with step 202 in which a luma component of the coding unit or block B is split into two blocks B1 and B2 of Z luma samples vertically and width Y luma samples horizontally without decoding any syntax element indicating such a split on the block level. In some embodiments, Z is equal to heightY/2. In step 204, at least one transform coefficient is decoded for block B1 and an inverse transform is applied to block B1. In additional or alternative step 206, at least one transform coefficient is decoded for block B2 and an inverse transform is applied to block B2. In step 208, a deblocking filter is applied to a boundary between block B1 and B2 that modifies at least F luma samples on the B1 side of the boundary and at least F luma samples on the B2 side of the boundary. In some embodiments, the deblocking filter comprises a long deblocking filter.

In some embodiments, N is equal to 64, heightY is equal to 128, width Y is equal to 64, and F is equal to two. In some embodiments, N is equal to 64, heightY is equal to 128, and widthY is equal to 32. In some embodiments, F is equal to three, five or seven.

In some embodiments, process 200 includes a further step 210 in which the decoder determines whether the block B1 or block B2 uses intra prediction. In some embodiments, heightY is smaller than or equal to 2*N.

Figure 3:
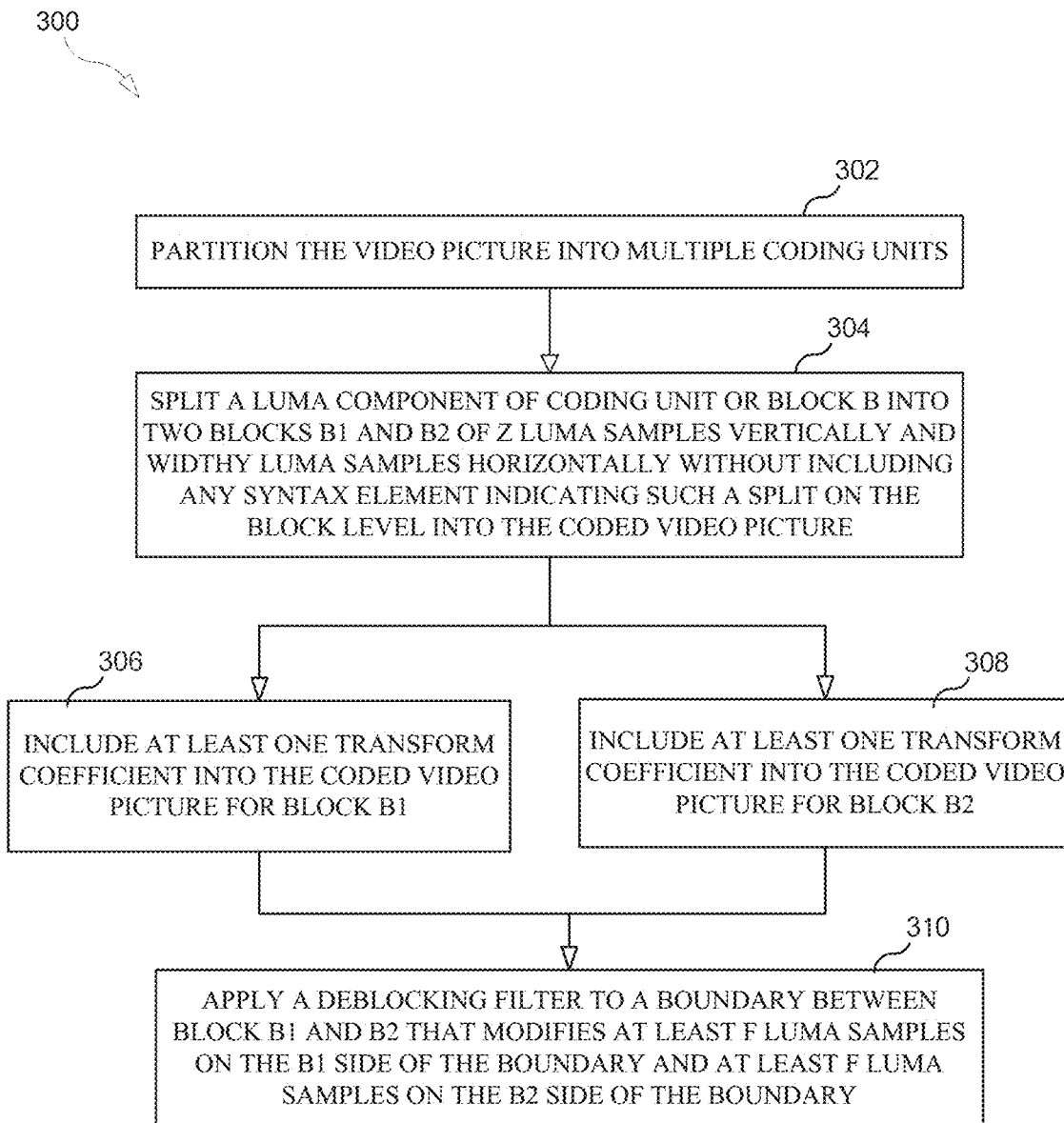
FIG. 3 is a flow chart illustrating a process according to one embodiment.

FIG. 3 is a flow chart illustrating an encoding process 300 with vertical implicit split for luma according to some embodiments. The encoding process 300 may be performed by an encoder.

The encoding process 300 for encoding a video picture where a maximum size is set equal to the value N may begin with step 302 in which the encoder partitions the video picture into multiple coding units (CUs). In some embodiments, one coding unit or block B in the video picture has a size of heightY luma samples vertically and width Y luma samples horizontally where heightY is larger than N, and width Y is equal to or smaller than N. In step 304, the luma component of coding unit or block B is split into two blocks B1 and B2 of Z luma samples vertically and width Y luma samples horizontally without including any syntax element indicating such a split on the block level into the coded video picture. In some embodiments, Z is equal to heightY/2. In step 306, at least one transform coefficient is included into the coded video picture for block B1. In additional or alternative step 308, at least one transform coefficient is included into the coded video picture for block B2. In step 310, a deblocking filter is applied to a boundary between block B1 and B2 that modifies at least F luma samples on the B1 side of the boundary and at least F luma samples on the B2 side of the boundary. In some embodiments, the deblocking filter comprises a long deblocking filter.

In some embodiments, N is equal to 64, heightY is equal to 128 and width Y is equal to 64, F is equal to two. In some embodiments, N is equal to 64, heightY is equal to 128 and width Y is equal to 32. In some embodiments, F is three, five or seven.

In some embodiments, process 300 includes a further step 312 in which the decoder determines whether block B1 or block B2 uses intra prediction. In some embodiments, heightY is smaller than or equal to 2*N.

Figure 4:
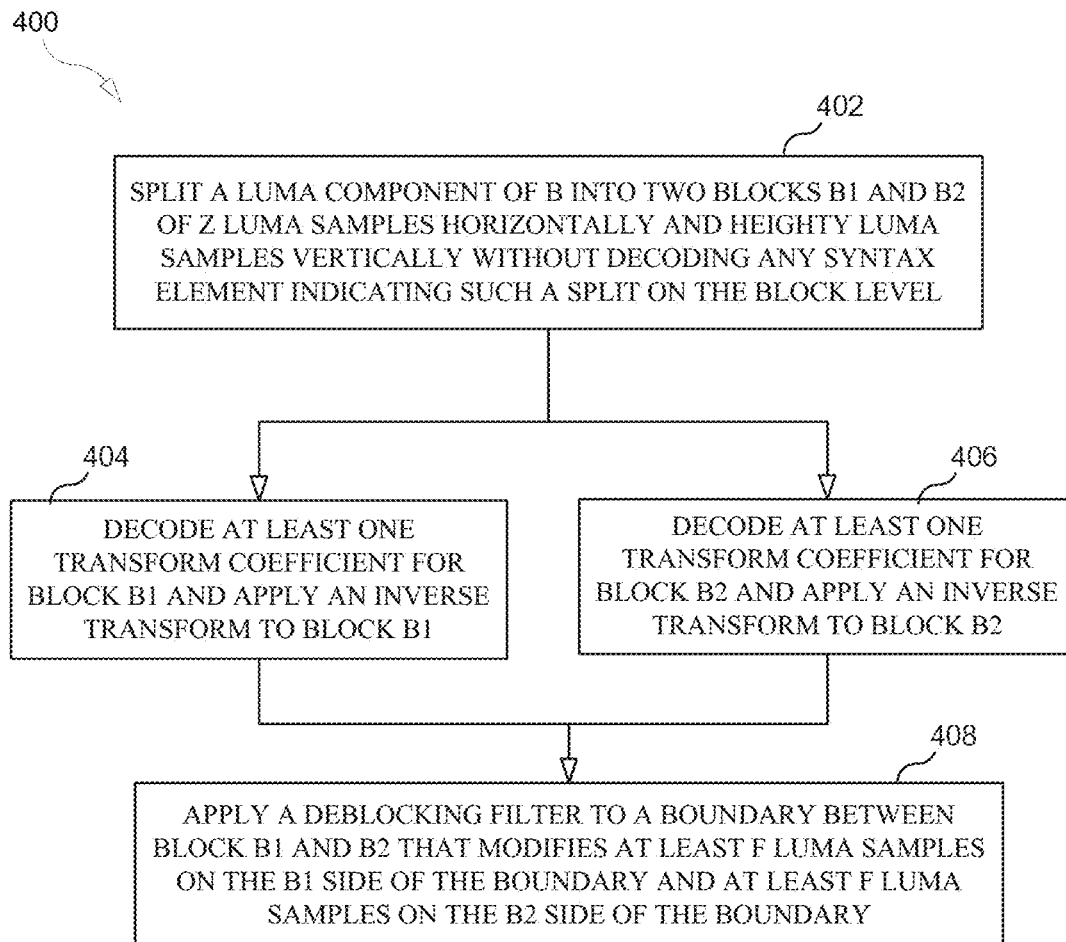
FIG. 4 is a flow chart illustrating a process according to one embodiment.

FIG. 4 is a flow chart illustrating a decoding process 400 with horizontal implicit split for luma according to some embodiments. The decoding process 400 may be performed by a decoder. In some embodiments, a maximum size for a video picture is set equal to the integer value N, one coding unit or block B in the video picture has a size of heightY luma samples vertically and widthY luma samples horizontally, width Y is larger than N, and heightY is equal to or smaller than N.

The decoding process 400 for decoding the video picture partitioned into multiple coding units (CUs) may begin with step 402 in which a luma component of coding unit or block B is split into two blocks B1 and B2 of Z luma samples horizontally and heightY luma samples vertically without decoding any syntax element indicating such a split on the block level. In some embodiments, where Z is equal to width Y/2. In step 404, at least one transform coefficient is decoded for block B1 and an inverse transform is applied to block B1. In additional or alternative step 406, at least one transform coefficient is decoded for block B2 and an inverse transform is applied to block B2. In step 408, a deblocking filter is applied to a boundary between block B1 and B2 that modifies at least F luma samples on the B1 side of the boundary and at least F luma samples on the B2 side of the boundary. In some embodiments, the deblocking filter comprises a long deblocking filter.

In some embodiments, N is equal to 64, heightY is equal to 128, width Y is equal to 64, and F is equal to two. In some embodiments, N is equal to 64, heightY is equal to 128, and width Y is equal to 32. In some embodiments, F is equal to three, five or seven.

In some embodiments, process 400 includes a further step 410 in which the decoder determines whether the block B1 or B2 block uses intra prediction. In some embodiments, width Y is smaller than or equal to 2*N.

Figure 5:
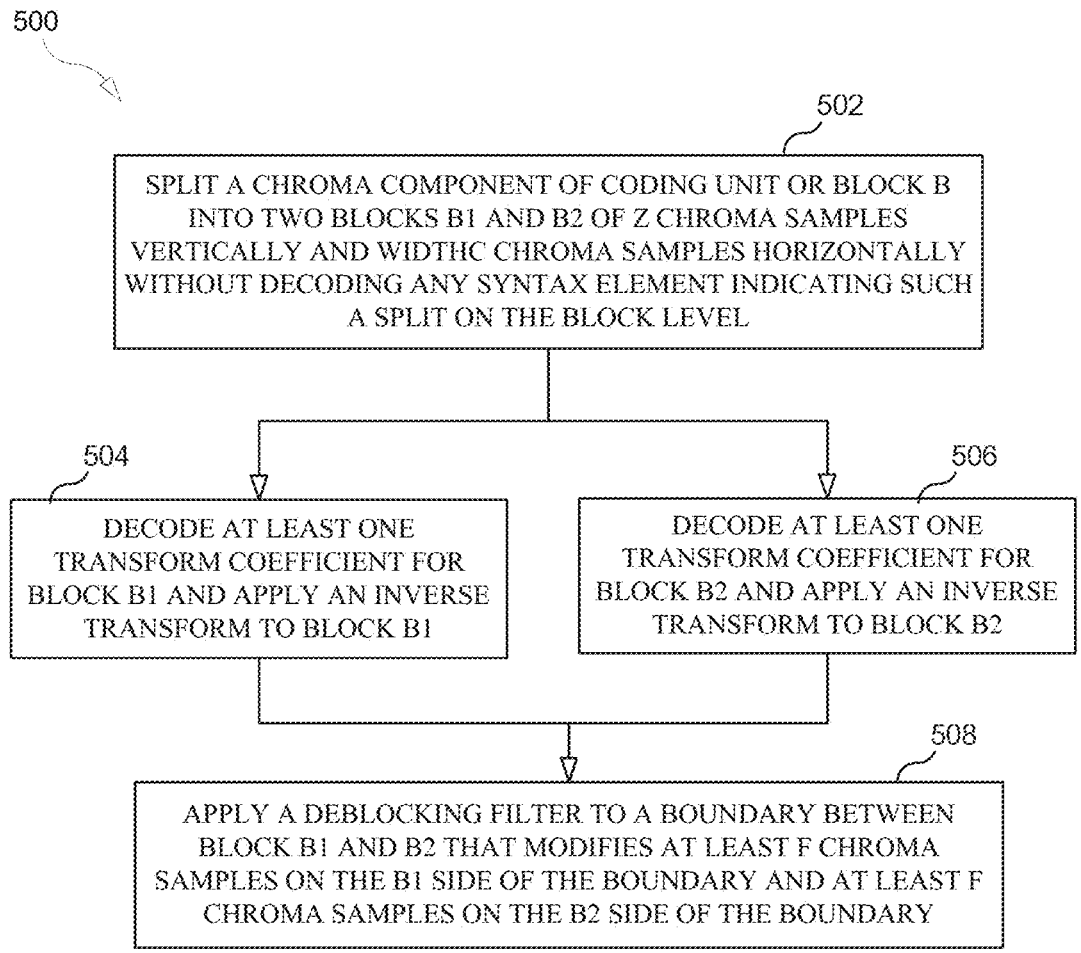
FIG. 5 is a flow chart illustrating a process according to one embodiment.

FIG. 5 is a flow chart illustrating a decoding process 500 with vertical implicit split for chroma according to some embodiments. The decoding process 500 may be performed by a decoder. In some embodiments, a maximum size for a video picture is set equal to the integer value N, one coding unit or block B in the video picture has a size of heightC chroma samples vertically and widthC chroma samples horizontally, heightC is larger than N, and widthC is equal to or smaller than N.

The decoding process 500 for decoding the video picture partitioned into multiple coding units (CUs) may begin with step 502 in which a chroma component of coding unit or block B is split into two blocks B1 and B2 of Z chroma samples vertically and widthC chroma samples horizontally without decoding any syntax element indicating such a split on the block level. In some embodiments, Z is equal to height C/2. In step 504, at least one transform coefficient is decoded for block B1 and an inverse transform is applied to block B1. In additional or alternative step 506, at least one transform coefficient is decoded for block B2 and an inverse transform is applied to block B2. In step 508, a deblocking filter is applied to a boundary between block B1 and B2 that modifies at least F chroma samples on the B1 side of the boundary and at least F chroma samples on the B2 side of the boundary. In some embodiments, the deblocking filter comprises a long deblocking filter.

In some embodiments, N is equal to 32, heightC is equal to 64 and widthC is equal to 32, F is equal to one. In another example, N is equal to 32, heightC is equal to 64 and widthC is equal to 16.

In some alternative embodiments, the process 500 may include a step in which the decoder determines whether block B1 or block B2 uses intra prediction instead of steps 504 and 506. In some embodiments, the process 500 may include a step in which the decoder determines whether block B1 or block B2 uses intra prediction in addition to steps 504 and 506. In some embodiments, heightC is smaller than or equal to 2*N.

Figure 6:
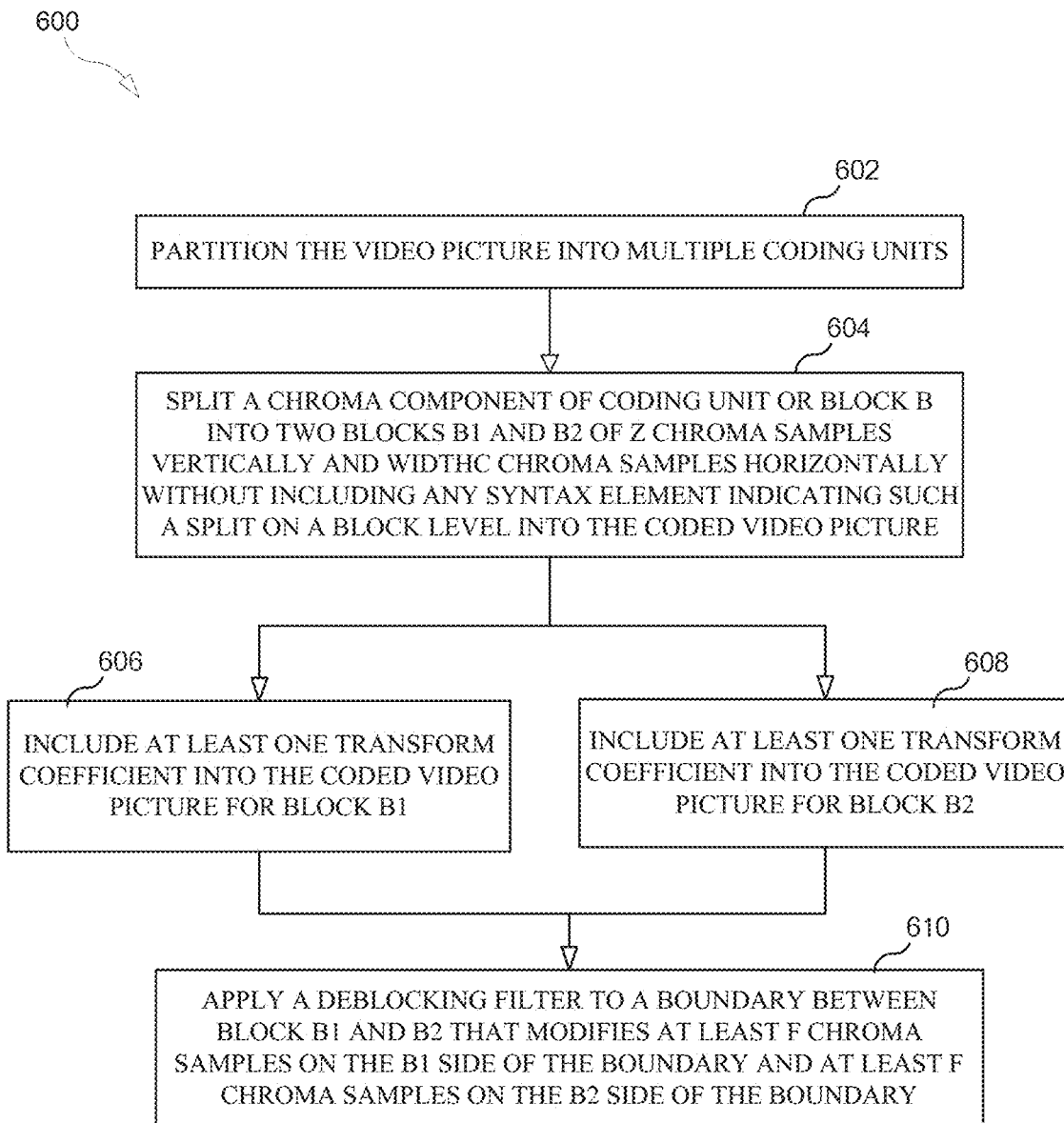
FIG. 6 is a flow chart illustrating a process according to one embodiment.

FIG. 6 is a flow chart illustrating an encoding process 600 with vertical implicit split for chroma according to some embodiments. The encoding process 600 may be performed by an encoder.

The encoding process 600 for encoding a video picture where a maximum size is set equal to the value N may begin with step 602 in which the encoder partitions the video picture into multiple coding units (CUs). In some embodiments, one coding unit or block B in the video picture has a size of heightC chroma samples vertically and widthC chroma samples horizontally, heightC is larger than N, and widthC is equal to or smaller than N. In step 604, the chroma component of coding unit or block B is split into two blocks B1 and B2 of Z chroma samples vertically and widthC chroma samples horizontally without including any syntax element indicating such a split on a block level into the encoded video picture into the coded video picture. In some embodiments, Z is equal to heightC/2. In step 606, at least one transform coefficient is included into the coded video picture for block B1. In additional or alternative step 608, at least one transform coefficient is included into the coded video picture for block B2. In step 610, a deblocking filter is applied to a boundary between block B1 and B2 that modifies at least F chroma samples on the B1 side of the boundary and at least F chroma samples on the B2 side of the boundary. In some embodiments, the deblocking filter comprises a long deblocking filter.

In some embodiments, N is equal to 32, heightC is equal to 64 and widthC is equal to 32, F is equal to one. In another example, N is equal to 32, heightC is equal to 64 and widthC is equal to 16.

In some embodiments, process 600 includes a further step 612 in which the encoder determines whether block B1 or block B2 uses intra prediction. In some embodiments, heightC is smaller than or equal to 2*N.

Figure 7:
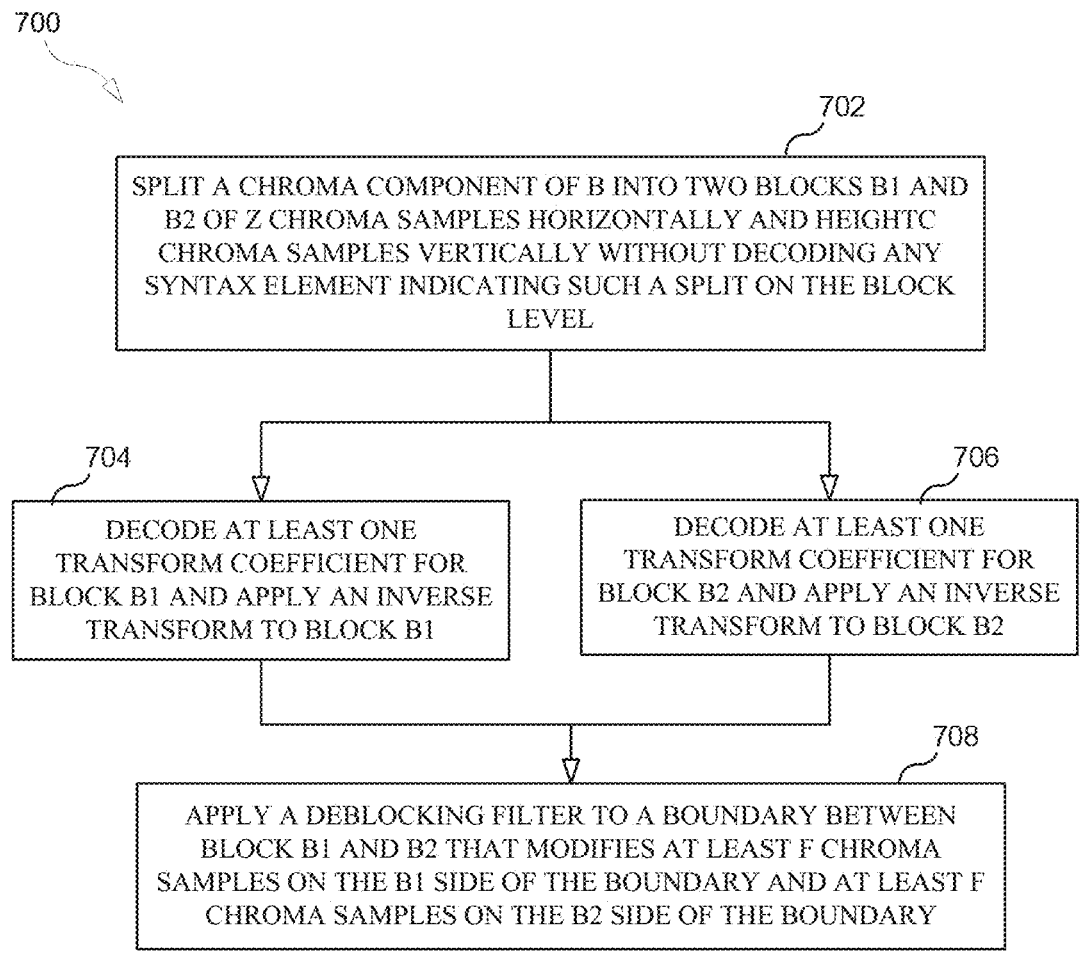
FIG. 7 is a flow chart illustrating a process according to one embodiment.

FIG. 7 is a flow chart illustrating a decoding process 700 with horizontal implicit split for chroma according to some embodiments. The decoding process 700 may be performed by a decoder. In some embodiments, a maximum size for a video picture is set equal to the integer value N, one coding unit or block B in the video picture has a size of heightC chroma samples vertically and widthC chroma samples horizontally, heightC is larger than N, and widthC is equal to or smaller than N.

The decoding process 700 for decoding the video picture partitioned into multiple coding units (CUs) may begin with step 702 in which a chroma component of B is split into two blocks B1 and B2 of Z chroma samples horizontally and heightC chroma samples vertically without decoding any syntax element indicating such a split on the block level. In some embodiments, where Z is equal to heightC/2. In step 704, at least one transform coefficient is decoded for block B1 and an inverse transform is applied to block B1. In additional or alternative step 706, at least one transform coefficient is decoded for block B2 and an inverse transform is applied to block B2. In step 708, a deblocking filter is applied to a boundary between block B1 and B2 that modifies at least F chroma samples on the B1 side of the boundary and at least F chroma samples on the B2 side of the boundary. In some embodiments, the deblocking filter comprises a long deblocking filter.

In some embodiments, N is equal to 32, heightC is equal to 64 and widthC is equal to 32, F is equal to one. In another example, N is equal to 32, heightC is equal to 64 and widthC is equal to 16.

In some alternative embodiments, the process 700 may include a step in which the decoder determines whether block B1 or block B2 uses intra prediction instead of steps 704 and 706. In some embodiments, the process 700 may include a step in which the decoder determines whether block B1 or block B2 uses intra prediction in addition to steps 504 and 506. In some embodiments, widthC is smaller than or equal to 2*N.

Table 1 below illustrates pseudo code directed to implementing embodiments for luma.

TABLE 1

```
// first filtering of luma for a CU boundary as in VVC
iEdge equal to 0 corresponds to CU boundary    //xEdgeFilterLuma process a
CU boundary when iEdgeOffset is 0, edgeDir is either a horizontal boundary
(EDGE_HOR) or a vertical boundary (EDGE_VER)
   xEdgeFilterLuma ( cu, edgeDir, iEdge );
   // iEdgeOffset describes the distance between the CU boundary and an
implicit TU boundary in units of 4 samples
   Int iEdgeOffset = 0;
   // Check if height is larger than the maximum transform size, since 128
is the maximum CU height only one implicit split is required. If that is the
case an implicit TU boundary (a boundary between B1 and B2) can occour 64
samples fron the upper horisontal CU boundary and then the iEdgeOffset is set
to 64/4.
```

TABLE 1-continued

```
    if ((cu.blocks[COMPONENT_Y].height > 64) && (edgeDir == EDGE_HOR))
        iEdgeOffset = 64 / 4;
    // Check if width is larger than the maximum transform size 64, since
128 is the maximum width only one implicit skip is required. If that is the
case an implicit TU boundary (a boundary between B1 and B2) can occour 64
samples from the left vertical CU boundary and then the iEdgeOffset is set to
64/4.
    if ((cu.blocks[COMPONENT_Y].width > 64) && (edgeDir == EDGE_VER))
        iEdgeOffset = 64 / 4 ;
    // then filtering of luma for implicit TU boundary (boundary between B1
and B2) when CU height is larger than 64 and the boundary is horisontal or
when the CU width is larger than 64 and the boundary is vertical
    if ((iEdgeOffset == 64 / 4))
        xEdgeFilterLuma(cu, edgeDir, iEdgeOffset);
```

In VVC the maximum CU size is 128×128 and the max TU size is 64×64. The maximum size N is therefore equal to 64. When the CU size is 128×128 and there are some transform coefficients to decode, the CU is divided into four non-overlapping 64×64 implicit TUs by an implicit split. A CU can be split into rectangular blocks such that the CU size before any implicit split is equal to 128×N or N×128 where N for example is 4, 8, 16, 32, 64. The CU is then implicitly split into two 64×N TUs or two N×64 TUs when there are transform coefficients in the CU.

The pseudo code shown in Table 1 illustrates changes to VVC to ensure that the boundaries between blocks B1 and B2 resulting from the implicit split described above may be deblocked by a deblocking filter when at least one of the blocks B1 and B2 has non-zero transform coefficients according to some embodiments.

As shown in Table 1, iEdgeOffset displaces the deblocking filter 64 samples from the CU boundary of a luma component where the displacement is expressed in units of 4 samples such that deblocking can be applied on the implicit TU boundary in luma. In some embodiments, edgeDir is either a horizontal boundary (EDGE_HOR) or a vertical boundary (EDGE_VER) and cu is the current CU.

In some embodiments, VVC only uses HEVC filters and decisions. In some embodiments, longer filters and decisions may be used, and especially for large blocks when the texture is smooth.

Figure 8:
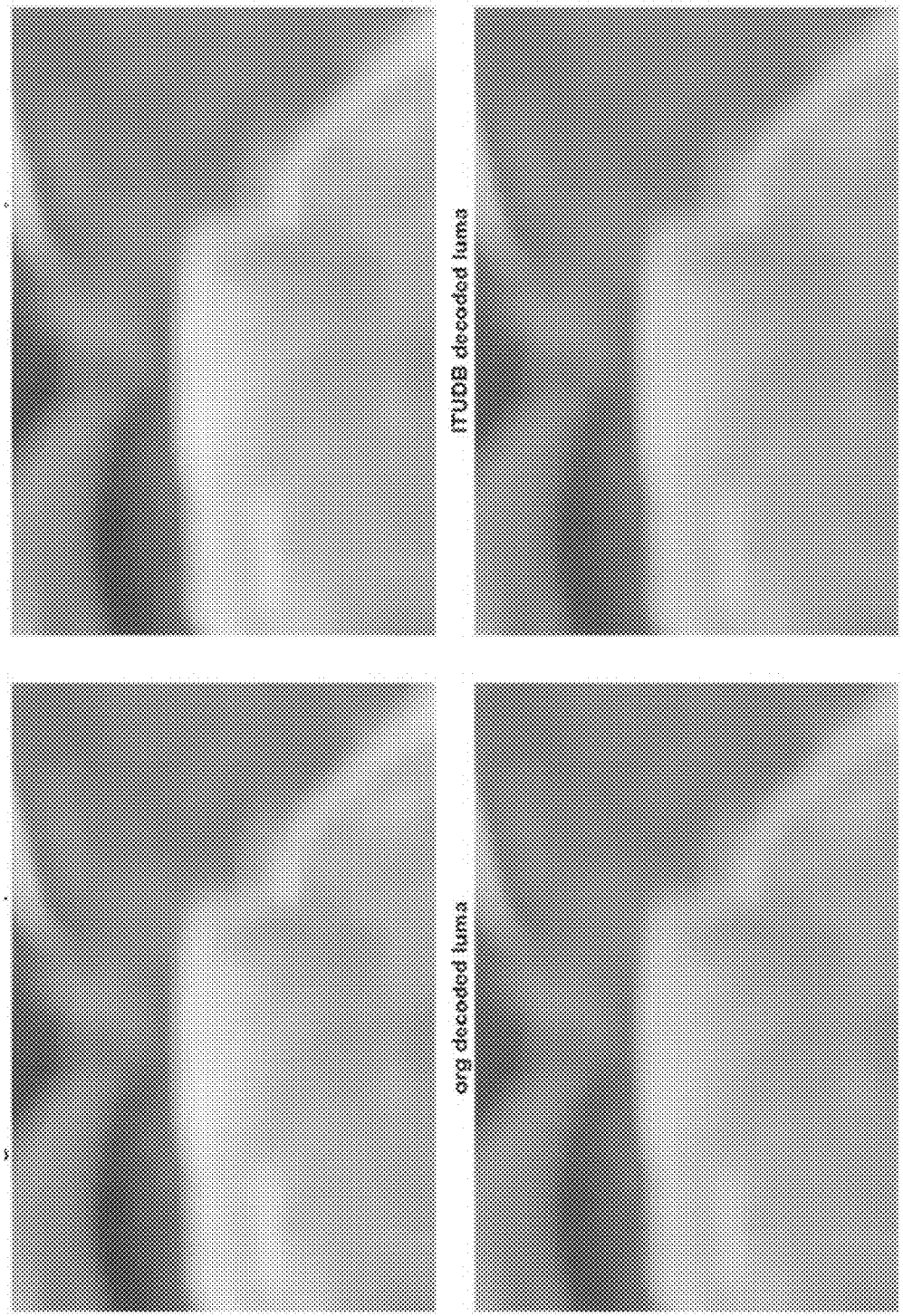
FIG. 8 shows exemplary pictures according to some embodiments.

FIG. 8 illustrates an example of the VVC implementing the pseudo code shown in Table 1 and an example of the VVC not implementing the pseudo code. In this instance, longer filters are used for both examples shown in FIG. 8. More specifically, FIG. 8 shows an example of the ITUDB improvement on LUMA for a same CU partition compared to an originally decoded LUMA.

Table 2 illustrates pseudo code directed to implementing embodiments for chroma in 4:2:0.

```
    // first filtering of chroma for a CU boundary as in VVC
        iEdge equal to 0 corresponds to CU boundary
    xEdgeFilterChroma( cu, edgeDir, iEdge );
    // iEdgeOffset describes the distance between the CU boundary and an implicit TU boundary
in units of 4 luma samples
    Int iEdgeOffset = 0;
    // Check if height is larger than the maximum transform size, since 32 is the maximum
transform size in chroma samples it is checked if the height is larger than 64 luma samples. If
that is the case an implicit TU boundary (a boundary between B1 and B2) can occour 64 luma
samples from the upper horisontal CU boundary and then the iEdgeOffset is set to 64/4.
    if ((cu.blocks[COMPONENT_Y].height > 64) && (edgeDir == EDGE_HOR))
        iEdgeOffset = 64 / 4;
    // Check if width is larger than the maximum transform size, since 32 is the maximum
transform size it is checked if the width is 128 luma samples. If that is the case an implicit TU
boundary (a boundary between B1 and B2) can occour 64 luma samples from the left vertical CU
boundary and then the iEdgeOffset is set to 64/4.
    if ((cu.blocks[COMPONENT_Y].width > 64) && (edgeDir == EDGE_VER))
        iEdgeOffset = 64 / 4;
    // then filtering of chroma for implicit TU boundary (boundary between B1 and B2) when CU
height is larger than 64 luma samples and the boundary is horisontal or when the CU width is
larger than 64 luma samples and the boundary is vertical
    if ((iEdgeOffset == 64 / 4))
        xEdgeFilterChroma(cu, edgeDir, iEdgeOffset);
```

In VVC the max CU size is 128×128 which corresponds to 64×64 chroma component in 4:2:0 and the max TU size for chroma is 32×32. The maximum size for chroma is therefore equal to 32. When the CU size is 128×128 and there are some transform coefficients to decode, the CU is divided into four non-overlapping 32×32 implicit TUs by an implicit split. A CU can be split into rectangular blocks such that block size in a chroma component before any implicit split is equal to 64×N and N×64 where N for example is 4, 8, 16, 32. The chroma block is then implicitly split into two 32×N or two N×32 TUs.

The pseudo code shown in Table 2 illustrates changes to VVC to ensure that the boundaries between blocks B1 and B2 resulting from the implicit split described above may be deblocked by a deblocking filter when at least one of the block B1 and B2 is intra predicted.

As shown in Table 2, iEdgeOffset displaces the deblocking filter 32 chroma samples (64 luma samples for 4:2:0) from CU boundary of a chroma component where the displacement is expressed in units of 4 samples such that deblocking can be applied on implicit TU boundary in chroma. In some embodiments, edgeDir is either a horizontal boundary (EDGE_HOR) or a vertical boundary (EDGE_VER) and cu is the current CU.

In some embodiments, iEdgeOffset may also be expressed in chroma samples. For 4:2:0, this would correspond to 32/4 instead of 64/4.

In some embodiments, in VVC only boundaries for intra coded CUs are deblocked and only one sample on each side of a boundary is deblocked. In some embodiments, VVC this may also include deblocking of inter coded CUs and deblocking using longer filters.

Figure 9:
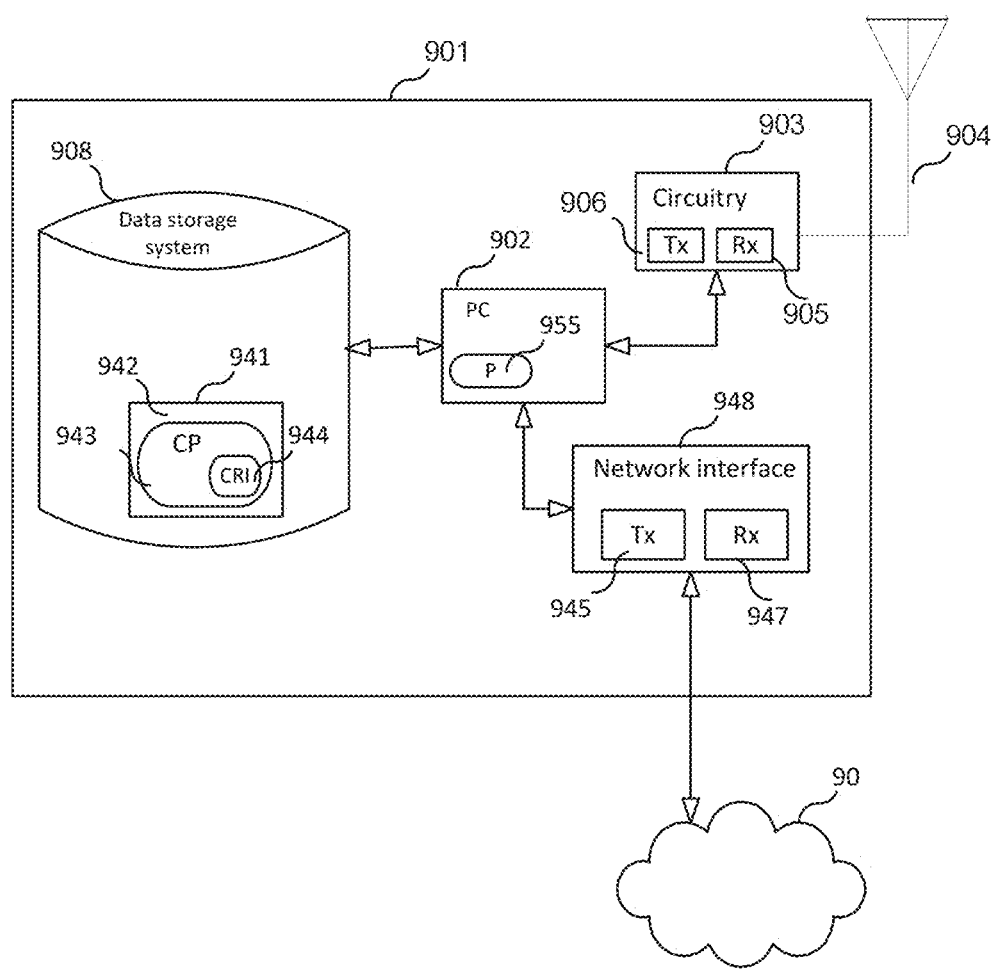
FIG. 9 is a block diagram of an encoder according to one embodiment.

FIG. 9 is a block diagram of an encoder 901 according to some embodiments. As shown in FIG. 9, encoder 901 may comprise: a processing circuit (PC) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling encoder 901 to transmit data to and receive data from other nodes connected to a network 90 (e.g., an Internet Protocol (IP) network) to which network interface 948 is connected; circuitry 903 (e.g., radio transceiver circuitry comprising an Rx 905 and a Tx 906) coupled to an antenna system 904 for wireless communication with UEs); and local storage unit (a.k.a., "data storage system") 908, which may include one or more non-volatile storage devices and/or one or more volatile storage devices (e.g., random access memory (RAM)). In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory, flash memory), and the like. In some embodiments, the CRI 944 of computer program 943 is configured such that when executed by data processing apparatus 902, the CRI causes encoder 901 to perform steps described herein (e.g., steps described herein with reference to the flow charts and/or message flow diagrams). In other embodiments, encoder 901 may be configured to perform steps described herein without the need for code. That is, for example, PC 902 may consist merely of one or more ASICs. Hence, the features of the embodiments described herein may be implemented in hardware and/or software.

Figure 10:
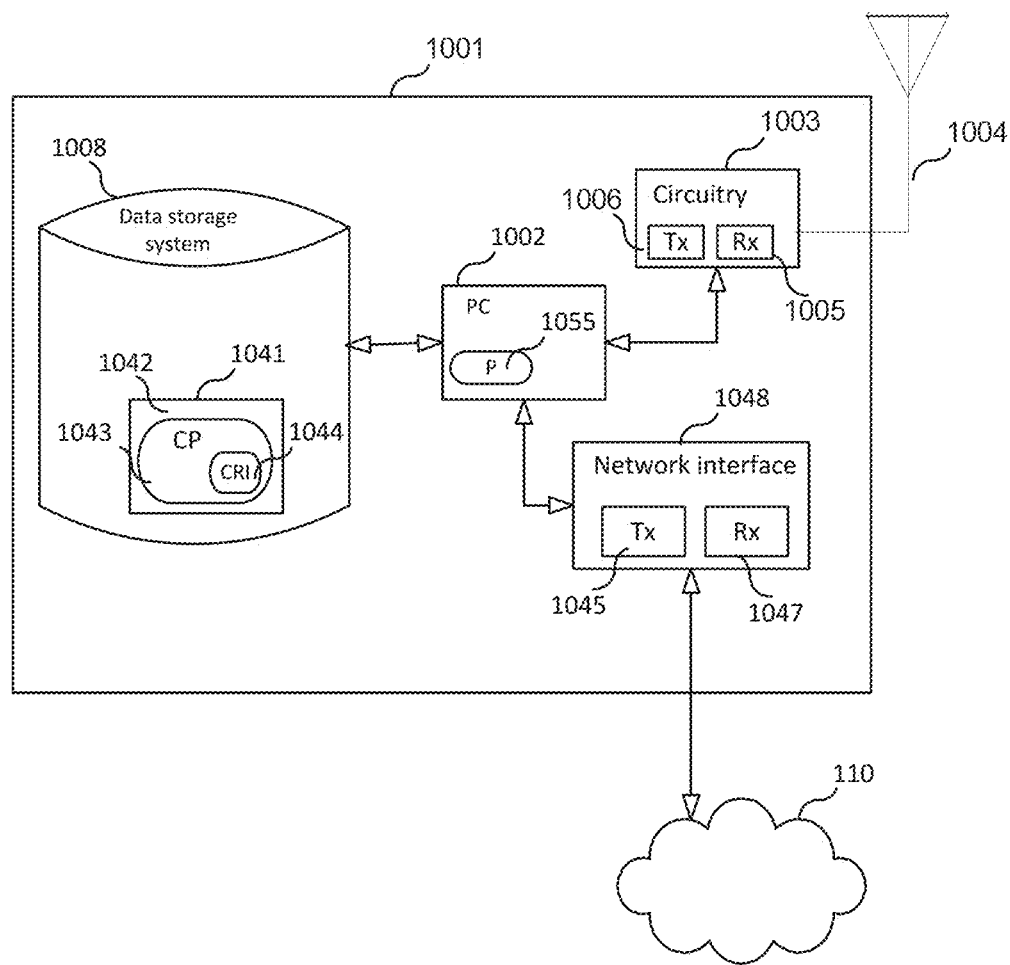
FIG. 10 is a block diagram of a decoder according to one embodiment.

FIG. 10 is a block diagram of decoder 1001 according to some embodiments. As shown in FIG. 10, decoder 1001 may comprise: a processing circuit (PC) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling decoder 1001 to transmit data to and receive data from other nodes connected to a network 110 (e.g., an Internet Protocol (IP) network) to which network interface 948 is connected; circuitry 903 (e.g., radio transceiver circuitry comprising an Rx 905 and a Tx 906) coupled to an antenna system 904 for wireless communication with UEs); and local storage unit (a.k.a., "data storage system") 908, which may include one or more non-volatile storage devices and/or one or more volatile storage devices (e.g., random access memory (RAM)). In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory, flash memory), and the like. In some embodiments, the CRI 944 of computer program 943 is configured such that when executed by data processing apparatus 902, the CRI causes decoder 1001 to perform steps described herein (e.g., steps described herein with reference to the flow charts and/or message flow diagrams). In other embodiments, decoder 1001 may be configured to perform steps described herein without the need for code. That is, for example, PC 902 may consist merely of one or more ASICs. Hence, the features of the embodiments described herein may be implemented in hardware and/or software.

Figure 11:
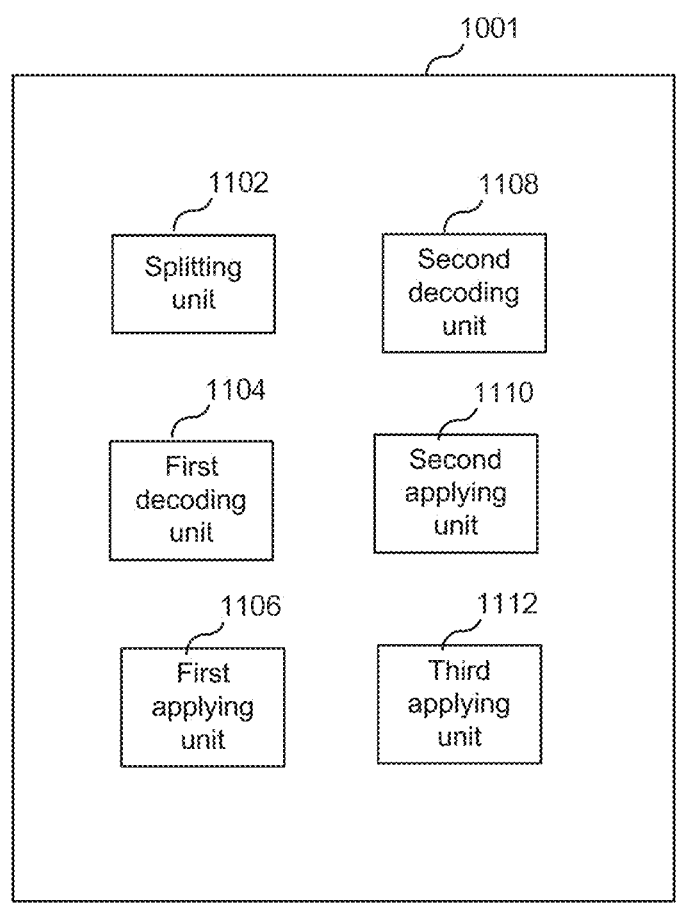
FIG. 11 is a diagram showing functional units of a decoder according to some embodiments.

FIG. 11 is a diagram showing functional units of decoder 1001 according to some embodiments. As shown in FIG. 11, decoder 1001 includes a splitting unit 1102 for splitting a luma component of the coding unit or block B into two blocks B1 and B2 of Z luma samples vertically and width Y luma samples horizontally without decoding any syntax element indicating such a split on the block levelforming a first prediction of the vector; a first decoding unit 1104 for decoding at least one transform coefficient for block B1; a first applying unit 1106 for applying an inverse transform to block B1; a second decoding unit 1108 for decoding at least one transform coefficient for block B2; a second applying unit 1110 for applying an inverse transform to block B2; a third applying unit 1112 for applying a deblocking filter to a boundary between block B1 and B2 that modifies at least F luma samples on the B1 side of the boundary and at least F luma samples on the B2 side of the boundary. In some embodiments, the splitting unit 1102 is for splitting a luma component of coding unit or block B into two blocks B1 and B2 of Z luma samples horizontally and heightY luma samples vertically without decoding any syntax element indicating such a split on the block level.

In some embodiments, the splitting unit 1102 is for splitting a chroma component of coding unit or block B into two blocks B1 and B2 of Z chroma samples vertically and widthC chroma samples horizontally without decoding any syntax element indicating such a split on the block level; and the third applying unit 1112 is for applying a deblocking filter to a boundary between block B1 and B2 that modifies at least F chroma samples on the B1 side of the boundary and at least F chroma samples on the B2 side of the boundary. In some embodiments, the splitting unit 1102 is for splitting a chroma component of B into two blocks B1 and B2 of Z chroma samples horizontally and heightC chroma samples vertically without decoding any syntax element indicating such a split on the block level.

Figure 12:
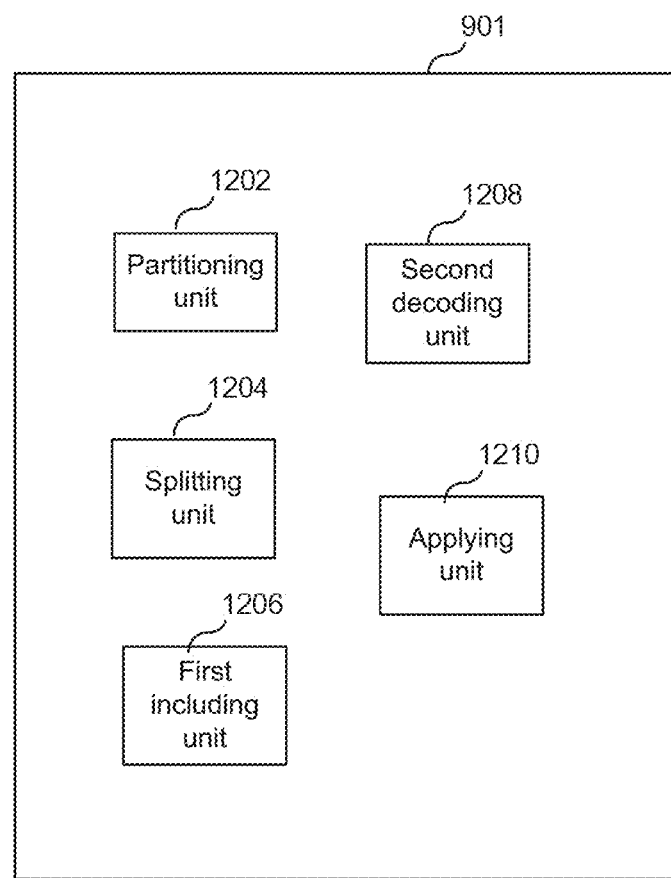
FIG. 12 is a diagram showing functional units of an encoder according to some embodiments.

FIG. 12 is a diagram showing functional units of encoder 901 according to some embodiments. As shown in FIG. 12, encoder 901 includes a partitioning unit 1202 for partitioning the video picture into multiple coding units; a splitting unit 1204 for splitting the luma component of coding unit or block B into two blocks B1 and B2 of Z luma samples vertically and width Y luma samples horizontally without including any syntax element indicating such a split on the block level into the coded video picture; a first including unit 1206 for including at least one transform coefficient into the coded video picture for block B1; a second including unit 1208 for including at least one transform coefficient into the coded video picture for block B2; an applying unit 1210 for applying a deblocking filter to a boundary between block B1 and B2 that modifies at least F luma samples on the B1 side of the boundary and at least F luma samples on the B2 side of the boundary. In some embodiments, the splitting unit 1204 is for splitting a chroma component of coding unit or block B into two blocks B1 and B2 of Z chroma samples vertically and widthC chroma samples horizontally without including any syntax element indicating such a split on a block level into the coded video picture.

SUMMARY OF SOME EMBODIMENTS

A1. A method for decoding a video picture, the method comprising: splitting a luma component of a coding unit or block into a first block a second block of Z luma samples vertically and width Y luma samples horizontally without decoding any syntax element indicating such a split on a block level, wherein a maximum size for the video picture is equal to an integer value N, the coding unit or block in the video picture comprises a size of heightY luma samples vertically and width Y luma samples horizontally, the heightY is larger than N, the width Y is equal to or smaller than N, and Z is equal to the width Y/2; decoding at least one transform coefficient for one or more of the first block and the second block; applying an inverse transform to one or more of the first block and the second block; and applying a deblocking filter to a boundary between the first block and the second block that modifies one or more luma samples on the first block side of the boundary and one or more luma samples on the second block side of the boundary.

B1. A method for encoding a video picture, the method comprising: partitioning a video picture into multiple coding units; splitting a luma component of a coding unit or block into a first block and a second block of Z luma samples vertically and width Y luma samples horizontally without including any syntax element indicating such a split on a block level into the encoded video picture, wherein a maximum size for the video picture is equal to an integer value N, the coding unit or block in the video picture comprises a size of heightY luma samples vertically and width Y luma samples horizontally, the heightY is larger than N, the widthY is equal to or smaller than N, and Z is equal to heightY/2; including at least one transform coefficient into the encoded video picture for one or more of the first block and the second block; and applying a deblocking filter to a boundary between the first block and the second block that modifies one or more luma samples on the first block side of the boundary and one or more luma samples on the second block side of the boundary.

C1. A method for decoding a video picture, the method comprising: splitting a luma component of a coding unit or block into a first block a second block of Z luma samples horizontally and heightY luma samples vertically without decoding any syntax element indicating such a split on the block level, wherein a maximum size for the video picture is equal to an integer value N, the coding unit or block in the video picture comprises a size of heightY luma samples vertically and width Y luma samples horizontally, the heightY is larger than N, the width Y is equal to or smaller than N, and Z is equal to the width Y/2; decoding at least one transform coefficient for one or more of the first block and the second block; applying an inverse transform to one or more of the first block and the second block; and applying a deblocking filter to a boundary between the first block and the second block that modifies one or more luma samples on the first block side of the boundary and one or more luma samples on the second block side of the boundary.

D1. A method for decoding a video picture, the method comprising: splitting a chroma component of a coding unit or block into a first block a second block of Z chroma samples vertically and widthC chroma samples horizontally without decoding any syntax element indicating such a split on a block level, wherein a maximum size for the video picture is equal to an integer value N, the coding unit or block in the video picture comprises a size of heightC chroma samples vertically and widthC chroma samples horizontally, the heightC is larger than N, the widthC is equal to or smaller than N, and Z is equal to heightC/2; decoding at least one transform coefficient for one or more of the first block and the second block; applying an inverse transform to one or more of the first block and the second block; and applying a deblocking filter to a boundary between the first block and the second block that modifies one or more chroma samples on the first block side of the boundary and one or more chroma samples on the second block side of the boundary.

E1. A method for encoding a video picture, the method comprising: partitioning a video picture into multiple coding units; splitting a chroma component of a coding unit or block into a first block and a second block of Z chroma samples vertically and widthC chroma samples horizontally without including any syntax element indicating such a split on a block level into the encoded video picture, wherein a maximum size for the video picture is equal to an integer value N, the coding unit or block in the video picture comprises a size of heightC chroma samples vertically and widthC chroma samples horizontally, heightC is larger than N, widthC is equal to or smaller than N, and Z is equal to the heightC/2; including at least one transform coefficient into the encoded video picture for one or more of the first block and the second block; and applying a deblocking filter to a boundary between the first block and the second block that modifies one or more chroma samples on the first block side of the boundary and one or more chroma samples on the second block side of the boundary.

F1. A method for decoding a video picture, the method comprising: splitting a chroma component of a coding unit or block into a first block a second block of Z chroma samples horizontally and heightC chroma samples vertically without decoding any syntax element indicating such a split on the block level, wherein a maximum size for a video picture is set equal to the integer value N, the coding unit or block in the video picture comprises a size of heightC chroma samples vertically and widthC chroma samples horizontally, the heightC is larger than N, the widthC is equal to or smaller than N, and Z is equal to heightC/2; decoding at least one transform coefficient for one or more of the first block and the second block; applying an inverse transform to one or more of the first block and the second block; and applying a deblocking filter to a boundary between the first block and the second block that modifies one or more chroma samples on the first block side of the boundary and one or more chroma samples on the second block side of the boundary. Further definitions are provided below.

Another embodiment includes a method for decoding a coded video picture, where the method includes obtaining a rectangular block B of the coded video picture, wherein the rectangular block B is of size D1×D2, wherein D1 is greater than N and N is a predetermined maximum transform size. The method also includes determining that D1 is greater than N, and, after determining that D1 is greater than N, splitting the block B into at least a first rectangular sub-block B1 and a second rectangular sub-block B2, thereby forming a boundary between the first sub-block B1 and the second sub-block B2, wherein the sub-block B1 is of size N×D2 or N×N, and wherein the sub-block B2 is of size N×D2 or N×N. The method also includes applying a deblocking filter to the boundary between the first sub-block B1 and the second sub-block B2 when at least one of the sub-blocks B1 or B2 contains transform coefficients, wherein the deblocking filter modifies one or more samples on the first block side of the boundary and one or more samples on the second block side of the boundary. In another embodiment there is provided a decoder adapted to perform this method.

Another embodiment includes a method for encoding a video picture to produce an encoded video picture, where the method includes splitting the video picture into multiple blocks, the multiple blocks including a first rectangular block B, wherein the rectangular block B is of size D1×D2, wherein D1 is greater than N, and N is a predetermined maximum transform size. The method also includes determining that D1 is greater than N, and, after determining that D1 is greater than N, splitting the block B into a first rectangular sub-block B1 and a second rectangular sub-block B2, thereby forming a boundary between the first sub-block B1 and the second sub-block B2, wherein the sub-block B1 is of size N×D2 or N×N and the sub-block B2 is of size N×D2 or N×N. The method also includes including in the encoded video picture at least one transform coefficient for sub-block B1 and/or sub-block B2. The method further includes applying a deblocking filter to the boundary between the first sub-block B1 and the second sub-block B2 when at least one of the sub-blocks B1 or B2 contains transform coefficients, wherein the deblocking filter modifies one or more samples on the first block side of the boundary and one or more samples on the second block side of the boundary. In another embodiment there is provided an encoder adapted to perform this method.

Figure 13:
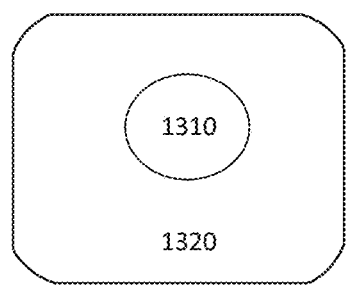
FIG. 13 illustrates a computer program product according to an embodiment.

Another embodiment includes a computer program 1310 (see FIG. 13), comprising instructions which, when performed by a processing circuit, cause the processing circuit to carry out the method according to any one of the above described method embodiments. In one embodiment, a carrier 1320 comprises the above mentioned computer program 1310, wherein the carrier is one of an electronic signal, optical signal, radio signal, or computer readable storage medium.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method for decoding a coded video picture, the method comprising:
   obtaining a coding block B of luma samples, wherein the block B is of size D1×D2, wherein D1 and D2 are less than or equal to 128;
   determining that D1 is greater than a predetermined maximum transform size (N), wherein N is 64 or 32;
   in response to determining that D1 is greater than N, specifying at least a first sub-block B1 of block B and a second sub-block B2 of block B, wherein the sub-block B1 is of size $(D1/2^m) \times (D2/2^n)$, and wherein the sub-block B2 is of size $(D1/2^m) \times (D2/2^n)$, wherein m is 1 or 2 and n is 0, 1, or 2, and further wherein at least one of the sub-blocks B1 and B2 contains non-zero transform coefficients; and
   applying a deblocking filter to a boundary between the first sub-block B1 and the second sub-block B2, wherein the deblocking filter modifies one or more samples on a first side of the boundary and one or more samples on a second side of the boundary.

2. The method of claim 1, further comprising:
   determining whether at least one of the sub-blocks B1 or B2 contains non-zero transform coefficients, wherein the specifying at least a first sub-block B1 of block B and a second sub-block B2 of block B is performed further in response to determining that at least one of the sub-blocks B1 and B2 contains non-zero transform coefficients.

3. The method of claim 2, wherein
   the specifying at least a first sub-block B1 of block B and a second sub-block B2 of block B, and the applying a deblocking filter to a boundary between the first sub-block B1 and the second sub-block B2, are not performed when no non-zero transform coefficients are included in the first sub-block B1 and no non-zero transform coefficients are included in the second sub-block B2.

4. The method of claim 1, further comprising:
   decoding at least one non-zero transform coefficient for the first sub-block B1;
   applying an inverse transform to the first sub-block B1, thereby producing a first inverse transformed sub-block; and
   adding a first prediction block to the first inverse transformed sub-block, thereby producing a first reconstructed sub-block, wherein
   applying a deblocking filter to the boundary between the first sub-block B1 and the second sub-block B2 comprises applying a deblocking filter to the boundary between first reconstructed sub-block and the second sub-block B2.

5. The method of claim 1, wherein the block B is a block of a Coding Unit (CU).

6. The method of claim 1, wherein
   D1 is the height of the block B and D2 is the width of the block B, and D1=128 and N=64.

7. The method of claim 1, wherein
   D2 is the height of the block B and D1 is the width of the block B, and D1=128 and N=64.

8. The method of claim 1, wherein

D2 is greater than N, and specifying at least a first sub-block B1 of block B and a second sub-block B2 of block B comprises specifying the first sub-block B1, the second sub-block B2, a third sub-block B3 of the block B, and a fourth sub-block B4 of the block B.

9. The method of claim 8, further comprising applying a deblocking filter to a boundary between the first sub-block B1 and the third sub-block B3, applying a deblocking filter to a boundary between the second sub-block B2 and the fourth sub-block B4, and/or applying a deblocking filter to a boundary between the third sub-block B3 and the fourth sub-block B4.

10. A method for encoding a video picture to produce an encoded video picture, the video picture comprising a plurality blocks, the plurality of blocks comprising a coding block B of luma samples, wherein the block B is of size D1×D2, wherein D1 and D2 are less than or equal to 128, the method comprising:

determining that D1 is greater than a predetermined maximum transform size (N), wherein N is 64 or 32;

in response to determining that D1 is greater than N, specifying at least a first sub-block B1 of block B and a second sub-block B2 of block B, wherein the sub-block B1 is of size $(D1/2^m) \times (D2/2^n)$, and wherein the sub-block B2 is of size $(D1/2^m) \times (D2/2^n)$, wherein m is 1 or 2 and n is 0, 1, or 2, and further wherein at least one of the sub-blocks B1 and B2 contains non-zero transform coefficients;

including in the encoded video picture at least one non-zero transform coefficient for sub-block B1 and/or sub-block B2; and applying a deblocking filter to a boundary between the first sub-block B1 and the second sub-block B2, wherein the deblocking filter modifies one or more samples on a first side of the boundary and one or more samples on a second side of the boundary.

11. The method of claim 10, further comprising:

decoding at least one non-zero transform coefficient for the first sub-block B1;

applying an inverse transform to the first sub-block B1, thereby producing a first inverse transformed sub-block; and adding a first prediction block to the first inverse transformed sub-block, thereby producing a first reconstructed sub-block, wherein applying a deblocking filter to the boundary between the first sub-block B1 and the second sub-block B2 comprises applying a deblocking filter to the boundary between the first reconstructed sub-block and the second sub-block B2.

12. The method of claim 10, wherein the block B is a block of a Coding Unit (CU).

13. The method of claim 10, wherein

D1 is the height of the block B and D2 is the width of block B,

D1=128, and N=64.

14. The method of claim 10, wherein

D2 is the height of the block B,

D1 is the width of the block B,

D1=128, and

N=64.

15. The method of claim 10, wherein

D2 is greater than N, and specifying at least a first sub-block B1 of block B and a second sub-block B2 of block B comprises specifying the first sub-block B1, the second sub-block B2, a third sub-block B3 of the block B, and a fourth sub-block B4 of the block B.

16. The method of claim 15, further comprising applying a deblocking filter to a boundary between the first sub-block B1 and the third sub-block B3, applying a deblocking filter to a boundary between the second sub-block B2 and the fourth sub-block B4, and/or applying a deblocking filter to a boundary between the third sub-block B3 and the fourth sub-block B4.

17. A computer program product comprising a non-transitory computer readable medium storing a computer program comprising instructions which, when performed by a processing circuit, cause the processing circuit to carry out the method according to claim 1.

18. A computer program product comprising a non-transitory computer readable medium storing a computer program comprising instructions which, when performed by a processing circuit, cause the processing circuit to carry out the method according to claim 10.

19. A decoder for decoding a coded video picture, the decoder being adapted to perform a method comprising:

obtaining a coding block B of luma samples, wherein the block B is of size D1×D2, wherein D1 and D2 are less than or equal to 128;

determining that D1 is greater than a predetermined maximum transform size (N), wherein N is 64 or 32;

in response to determining that D1 is greater than N, specifying at least a first sub-block B1 of block B and a second sub-block B2 of block B, wherein the sub-block B1 is of size $(D1/2^m) \times (D2/2^n)$, and wherein the sub-block B2 is of size $(D1/2^m) \times (D2/2^n)$, wherein m is 1 or 2 and n is 0, 1, or 2, and further wherein at least one of the sub-blocks B1 and B2 contains non-zero transform coefficients; and applying a deblocking filter to a boundary between the first sub-block B1 and the second sub-block B2, wherein the deblocking filter modifies one or more samples on a first side of the boundary and one or more samples on a second side of the boundary.

20. An encoder for encoding a video picture to produce an encoded video picture, the video picture comprising a plurality blocks, the plurality of blocks comprising a coding block B of luma samples, wherein the block B is of size D1×D2, wherein D1 and D2 are less than or equal to 128, the encoder being adapted to perform a method comprising:

determining that D1 is greater than a predetermined maximum transform size (N), wherein N is 64 or 32;

in response to determining that D1 is greater than N, specifying at least a first sub-block B1 of block B and a second sub-block B2 of block B, wherein the sub-block B1 is of size $(D1/2^m) \times (D2/2^n)$, and wherein the sub-block B2 is of size $(D1/2^m) \times (D2/2^n)$, wherein m is 1 or 2 and n is 0, 1, or 2, and further wherein at least one of the sub-blocks B1 and B2 contains non-zero transform coefficients;

including in the encoded video picture at least one non-zero transform coefficient for sub-block B1 and/or sub-block B2; and applying a deblocking filter to a boundary between the first sub-block B1 and the second sub-block B2, wherein the deblocking filter modifies one or more samples on a first side of the boundary and one or more samples on a second side of the boundary.

\* \* \* \* \*